Oct. 7, 1947.  J. G. PRUITT ET AL  2,428,471
MAGNETIC TESTING METHOD AND APPARATUS
Filed Feb. 8, 1943
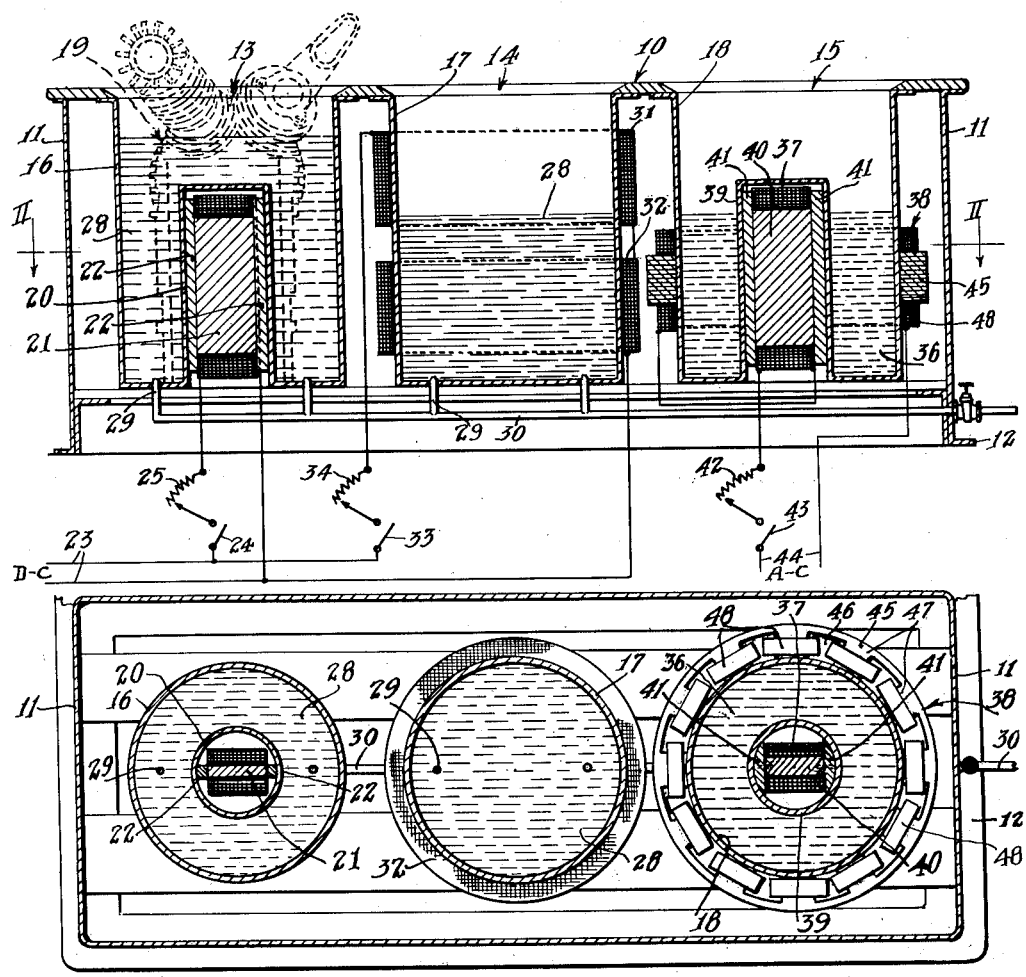
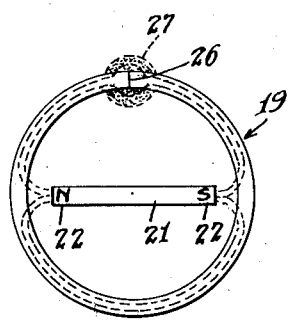
Inventors
John G. Pruitt
Elmer R. Oberdorf
By
Lyon & Lyon, Attorneys Patented Oct. 7, 1947

2,428,471

UNITED STATES PATENT OFFICE 2,428,471

MAGNETIC TESTING METHOD AND APPARATUS

John Gray Pruitt, San Diego, and Elmer Reagan Oberdorf, Lakeside, Calif., assignors, by direct and mesne assignments, to Magnaflux Corporation, Chicago, Ill., a corporation of Delaware Application February 8, 1943, Serial No. 475,062

6 Claims. (Cl. 175—183)

This invention relates to the magnetic testing of ferrous bodies to detect flaws therein.

It relates more particularly to what is known as the "wet method" in which the object to be tested is immersed in a liquid having in suspension fine particles of paramagnetic material, such as iron dust, and a magnetic flux is set up in the object. The magnetic flux tends to be confined within the object, due to the fact that the object itself provides a low reluctance return path for the magnetic field establishing means. If there is no discontinuity in the metal, such as a fissure or crack extending across the path of the magnetic flux, a leakage field will be established at the place of discontinuity, which in effect is like the non-magnetic gap region between a pair of magnetic poles of opposite polarity. This leakage field will attract some of the iron dust to the surface of the object adjacent the fissure and give a visual indication thereof.

The dust continues to adhere to the object after it has been removed from the exciting magnetic field and the testing liquid because of residual magnetism and in most instances it is desirable to remove the dust after the test is complete as well as to demagnetize the object.

It is to be borne in mind that in actual practice some iron dust adheres to objects having no flaws, and flaws are indicated by an excess of dust deposit so that the problem of removing the iron dust after the test exists with perfect objects as well as with imperfect ones.

An object of the present invention is to facilitate the magnetic detection of longitudinal flaws in cylindrical objects.

Another object is to quickly and easily demagnetize and clean objects after they have been magnetically tested by the wet method.

We attain the first object in accordance with the invention by providing a special magnetizing structure insertable within a cylindrical object to be tested, which structure produces a magnetic field extending circularly or circumferentially through the cylinder walls so that the magnetic flux will intersect any crack or fissure which extends at a substantial angle thereto and establish a leakage flux thereat. The cylindrical object may also be tested with a longitudinal flux to detect circumferentially extending fissures but the present invention is more particularly concerned with the detection of longitudinally extending fissures.

We attain the second object in accordance with the invention by simultaneously exposing the tested object to a washing medium and a demagnetizing influence so that the iron dust is released and removed in a single operation.

Other more specific objects and features of the invention will become apparent from the detailed description to follow of a preferred embodiment of the invention.

In the drawing:

Fig. 1 is a vertical longitudinal sectional view through a magnetic testing apparatus in accordance with the invention.

Fig. 2 is a horizontal section in the plane II—II of Fig. 1, and

Fig. 3 is a schematic cross section illustrating the path of the flux through an article being tested.

The apparatus comprises a table 10 supported by side walls 11 and feet 12. The table 10 has three circular apertures 13, 14 and 15 therein which constitute the open upper ends of three liquid-tight cylindrical tanks 16, 17 and 18, all of which are made of some non-magnetic material such as brass or aluminum and are dimensioned according to the articles to be tested. The apparatus shown is designed for testing cylinders of airplane engines and for this purpose the tanks may be 11 inches in diameter and 13 inches deep. One such engine cylinder 19 is shown positioned in tank 16. Tank 16 contains equipment for testing the cylinder for longitudinally extending flaws. Tank 17 has associated therewith equipment for testing for circumferentially extending flaws when the cylinder is inserted there. The third tank 18 is the rinsing and demagnetizing tank for cleaning the cylinder and removing residual magnetism therefrom after it has been tested.

The magnetizing structure for tank 16 is positioned centrally therewithin, being positioned within a hollow center post or riser tube 20 of non-magnetic material, the riser tube being closed at its upper end and secured to the bottom of the tank 16 at its lower end. However, the tube 20 is open to the exterior of the tank at its lower end to receive the magnetizing element.

The magnetizing element consists of an H-shaped core of ferrous material having an energizing winding thereon. The core may be flat in shape, ½ inch thick, 4¾ inches wide and 11½ inches long at its pole pieces, so that it fits snugly within the tube 20. The coil is wound lengthwise of the core on the central portion 21 thereof, which central portion may consist of a piece of boiler plate. Secured to the opposite edges of the portion 21 are the pole pieces 22, which are preferably made of a material having relatively high magnetic retentivity, such as hard SAE-4130 steel. The design of the winding will, of course, depend upon the source of current available but we have employed 700 turns of No. 14 SEC wire with twelve amperes current.

In Fig. 1 the winding is shown connected to a D. C. supply line 23 through a switch 24 and a rheostat 25. When the magnetizing structure described is energized, one of the pole pieces 22 becomes a north pole and the other becomes a south pole, as indicated in Fig. 3, and if a cylinder 19 to be tested is positioned in the tank 16 over and surrounding the riser tube 20, the flux will flow out of the north pole 22 into the wall of the cylinder, thence around circumferentially through the cylinder in both directions to an area diametrically opposite where the flux leaves the cylinder and goes into the south pole 22 of the electromagnet. It will be observed from Fig. 3 that over the major portion of the cylinder the flux is confined within the cylinder wall. However, assume that there is a longitudinally extending fissure or crack 26 within the wall, then at this point the flux tends to leave the wall as indicated by the lines 27 and if a finely divided paramagnetic material, such as iron dust, is present, it will build up on the surface of the cylinder above the crack 26.

To provide iron dust wherever it may be needed to disclose a flaw, the tank 16 contains a liquid 28, such as oil or water, containing iron dust in suspension. To maintain this suspension, the liquid may be agitated by air issuing from jets 29 in the bottom of the tank, these jets being supplied from an air line 30.

Although, as shown in Fig. 3, the flux extends circumferentially through most of the cylinder wall, there is a small portion opposite each pole of the magnet where the flux is largely radial and it is, therefore, desirable to rotate the cylinder through a small angle, such as a one-quarter turn, during the test so that the circumferential flux will be created in all portions of the wall to provide for the detection of all longitudinal flaws.

After a cylinder has been tested for longitudinal flaws as described, it is removed from the tank 16 and inserted in the tank 17 to be tested for circumferential flaws. The tank 17 has no inner core but has two circumferentially extending energizing windings 31 and 32, respectively, which create a vertical flux through the tank 17, thereby setting up a vertical flux in the walls of the cylinder when the latter is positioned in this tank. Such a vertical flux will be interfered with by circumferentially extending fissures and iron dust will be deposited above at such flaws from a liquid 28 carrying iron dust in suspension, the same as described in connection with tank 16. Each of the coils 31 and 32 may have 700 turns of No. 14 SEC wire and they are connected in series through a switch 33 and rheostat 34 to the D. C. line 23. Any desired source of direct current may be employed.

After the cylinder has been tested in the tanks 16 and 17 as described, it is inserted in the tank 18 for elimination of residual magnetism resulting from the test tanks and the removal of iron dust from the surface. This tank 18, therefore, contains a liquid 36, such as water or oil, depending upon the composition of the liquid 28. The tank 18 also has associated with it two demagnetizing elements 37 and 38, respectively. The demagnetizing element 37 is in general similar in construction to the magnetizing element described in connection with tank 16 and is fitted within a riser tube 39 similar to the riser tube 20 in tank 16. The element 37 may be identical with that in the tank 16 except for the construction of the core. Thus the center section 40 of the core may consist of a piece of rectangular annealed steel 4 inches long, 3 inches wide and 1 inch thick, and the pole pieces 41 may each consist of a piece of half round annealed steel, 10½ inches long by 2½ inches wide by ⅞ inch thick, bolted to the edges of the center section 40. The winding may have the same number of turns (700) as the winding of the magnetizing magnet in tank 16 but it is adapted to be connected through a rheostat 42 and a switch 43 to an A. C. supply line 44. In accordance with well known practice, residual circular magnetism may be removed from a cylinder positioned in tank 18 by applying alternating current to the magnetizing structure 37 and then gradually reducing the current to zero by means of the rheostat 42. If desired, automatic timing means can be employed for manipulating the current but such devices are well known and do not constitute a part of the present invention.

Longitudinal magnetism may be removed from the cylinder while it is positioned within the cleaning tank 18 by the external magnetizing element 38, the construction of which is best shown in Fig. 2. It will be observed that this element comprises a laminated ring 45 having radial slots 46 therein which define a plurality of pole pieces 47 facing inwardly against the outer surface of the tank 18. Each pole piece 47 has a winding 48 thereon. Each winding 48 may consist of 32 turns of # 16 SEC wire and all of the coils are connected in series with each other and with the winding of the magnetizing element 37 so that both elements 37 and 38 are simultaneously energized from the A. C. line 44 through the rheostat 42 and the switch 43.

The windings of the coils are so poled that at a given instant three adjacent poles have the same polarity; the next group of three adjacent poles are of opposite polarity; the next group of three adjacent poles are of the same polarity as the first group; and the last group of three adjacent poles are of the same polarity as the second group. This sets up a flux which loops into the tank from three adjacent poles and splits, half going to the next group of poles and splits, half going to the next group of poles on one side thereof and the other half going to the next group of poles on the other side thereof. It has been found that this construction is very effective in demagnetizing objects within the tank 18 irrespective of their shape, being in no sense limited to the testing of cylinders. This is likewise true of the first and second tanks.

It is found that by simultaneously demagnetizing a tested object while it is exposed to a cleaning solution, substantially all of the particles of iron dust are completely removed, the iron dust settling to the bottom of the tank from which it may be recovered from time to time.

A particular advantage of the structure described is that it produces circular magnetism in a cylindrical object without passing current through the object itself and without the use of heavy currents. The apparatus can be energized from any lighting circuit. The fact that current is not passed directly through the object being tested greatly facilitates the rapid insertion and removal of the objects, since no electrical connection need be made thereto, and also prevents damage to the surface of the object due to arcing at the contacts, surface burns, etc.

Although for the purpose of explaining the invention a particular embodiment thereof has been described in substantial detail, numerous variations from the exact structure described can be made without departing from the invention, which is to be limited only to the extent set forth in the appended claims.

We claim:

1. Magnetic testing apparatus comprising a tank having a hollow center post therein, said tank and center post being formed of non-magnetic material, a ferromagnetic H-shaped core disposed within said center post with the legs of the H lying in substantially a vertical plane and in close proximity to the vertical walls of said center post, an electric coil around the cross bar of said H-shaped core, an energization circuit connected to said coil, the legs of said H-shaped core being so dimensioned that when a hollow magnetizable object is placed in said tank over said center post said object is transversely magnetized tangentially to its surface throughout substantially its entire peripheral surface.

2. Magnetic testing apparatus comprising a tank having a relatively high hollow tubular center post therein, said tank and center post being formed of non-magnetic material, a ferromagnetic H-shaped core disposed within said center post with the legs of the H lying in substantially a vertical plane in close proximity to the vertical walls of said center post and extending substantially from top to bottom of said center post, an electric coil around the cross-bar of said H-shaped core, an energization circuit connected to said coil, the legs of said H-shaped core being dimensioned in such a manner that when a hollow cylindrical magnetizable object is placed in said tank over said center post the cylindrical surface of said object is circumferentially magnetized throughout substantially its entire area.

3. Magnetic testing apparatus comprising a liquid containing tank having a relatively high hollow tubular center post therein, said tank and said center post being formed of non-magnetic material, a ferromagnetic H-shaped core disposed within said center post in a diametric plane thereof with the legs of the H lying in close proximity to the peripheral wall of said center post and extending substantially from the top to the bottom thereof, said legs also being relatively narrow in width, an electric coil around the cross-bar of said H-shaped core, an energization circuit connected to said coil whereby when a hollow cylindrical magnetizable object is placed in said tank over said center post, said object provides semi-circular low reluctance paths for the magnetic field set up by said electric coil, each of said semi-circular paths extending throughout nearly 180°.

4. The method of magnetizing cylindrical objects or the like formed of ferromagnetic material which includes applying magnetomotive forces of different magnetic potentials to said objects at circumferentially spaced areas thereof, said areas of application extending substantially the full length of said objects but being of very narrow width, whereby substantially the entire region of said object adjacent its peripheral surface acts as a low reluctance flux path between said spaced areas of different magnetic potential.

5. The method of magnetizing paramagnetic objects having a curved peripheral surface which includes applying magnetomotive forces of different magnetic potential to diametrically located areas on the surface thereof, the areas of application being extremely narrow but extending substantially the full length of the object, whereby substantially the entire region adjacent the curved peripheral surface thereof is magnetized in a peripheral direction.

6. Apparatus for magnetizing objects having a curved peripheral surface comprising means for establishing a magnetic field including a pair of magnetic poles, said poles being disposed so as to lie in close proximity to the curved surface of the object to be magnetized, and on opposite sides thereof, the faces of said poles adjacent said object being of such height as to extend substantially the length of said object, and of such width as to extend over a few degrees only of the peripheral surface of said object, whereby substantially the entire curved peripheral surface of said object is circumferentially magnetized.

JOHN GRAY PRUITT.
ELMER REAGAN OBERDORF.

REFERENCES CITED

The following references are of record in the file of this patent:

UNITED STATES PATENTS

| Number | Name | Date |
|---|---|---|
| 1,426,384 | Hoke | Aug. 22, 1922 |
| 2,216,600 | Moore | Oct. 1, 1940 |
| 2,257,736 | Ferrier | Oct. 7, 1941 |
| 2,118,174 | Doane | May 24, 1938 |
| 2,207,392 | Zuschlag | July 9, 1940 |